United States Patent
Ku et al.

(10) Patent No.: US 10,025,083 B2
(45) Date of Patent: Jul. 17, 2018

(54) ADJUSTABLE DUAL-LENS DEVICE FOR 3D STEREOSCOPIC SURGICAL MICROSCOPES

(71) Applicant: Visionnaire Medtech Co., Ltd., Changhua, Changhua County (TW)

(72) Inventors: Ming-Chou Ku, Changhua County (TW); Kai-Che Liu, Changhua County (TW); Kun-Wei Lin, Changhua County (TW); Ivan Ku, Changhua County (TW); Shih-Chi Chan, Changhua County (TW); Tong-Wen Wang, Changhua County (TW); I-Chun Lee, Changhua County (TW)

(73) Assignee: Visionnaire Medtech Co., Ltd., Changhua (TW)

( * ) Notice: Subject to any disclaimer, the term of this patent is extended or adjusted under 35 U.S.C. 154(b) by 231 days.

(21) Appl. No.: 15/172,849

(22) Filed: Jun. 3, 2016

(65) Prior Publication Data
US 2017/0351078 A1    Dec. 7, 2017

(51) Int. Cl.
| | |
|---|---|
| G02B 21/22 | (2006.01) |
| H04N 13/02 | (2006.01) |
| H04N 5/225 | (2006.01) |
| G06T 7/00 | (2017.01) |
| G02B 21/00 | (2006.01) |
| G02B 21/36 | (2006.01) |
| G02B 7/00 | (2006.01) |

(52) U.S. Cl.
CPC .............. *G02B 21/22* (2013.01); *G02B 7/001* (2013.01); *G02B 21/0012* (2013.01); *G02B 21/365* (2013.01); *G06T 7/0012* (2013.01); *H04N 5/2252* (2013.01); *H04N 5/2253* (2013.01); *H04N 5/2254* (2013.01); *H04N 5/2257* (2013.01); *H04N 13/0207* (2013.01); *H04N 13/0296* (2013.01)

(58) Field of Classification Search
CPC .... G02B 21/22; G02B 21/368; G02B 21/365; G02B 21/02; G02B 21/0012; G02B 7/003; H04N 13/0296; H04N 13/0207; H04N 5/2257; H04N 5/2254; H04N 5/2253; H04N 5/2252; G06T 7/0012
See application file for complete search history.

(56) References Cited

U.S. PATENT DOCUMENTS 5,896,223 A * 4/1999 Tigliev ............... G02B 7/14
                                                359/368
8,174,588 B1 * 5/2012 McKinley .......... G02B 21/365
                                                348/240.3

* cited by examiner

*Primary Examiner* — Christopher S Kelley
*Assistant Examiner* — Maria Vazquez Colon
(74) *Attorney, Agent, or Firm* — C. G. Mersereau; Nikolai & Mersereau, P.A.

(57) ABSTRACT

An adjustable dual-lens device for 3D stereoscopic surgical microscopes has an outer casing, an image set, and an adjusting set. The image set is mounted in the outer casing and has two lenses. The lenses are pivotally mounted in the outer casing at a spaced interval. The adjusting set is mounted in the outer casing and has two adjusting units. Each adjusting unit has a driving motor, a cam, and a limiting element. The driving motor is mounted in the outer casing adjacent to one of the lenses and has a driving shaft. The cam is eccentrically mounted around the driving shaft and is pressed against the lens that is adjacent to the driving motor. The limiting element is connected to the outer casing and the corresponding lens to enable the corresponding lens to press against the cam.

20 Claims, 8 Drawing Sheets

ADJUSTABLE DUAL-LENS DEVICE FOR 3D STEREOSCOPIC SURGICAL MICROSCOPES

BACKGROUND OF THE INVENTION

1. Field of the Invention

The present invention relates to a lens device, and more particularly to an adjustable dual-lens device for 3D stereoscopic surgical microscopes, wherein the dual-lens device is adjustable to provide different depths of field to capture clear images of organs or tissues at different depths, to provide instant images at different depths and to shorten the operation time effectively.

2. Description of Related Art

With the rapid development of technology, there is significant progress in medical technology, and 3D stereoscopic imaging technology is a very popular topic in the medical technology and can be applied in the clinical surgery. Then, the doctors can cut, remove or treat organs or tissues of complex and varied thicknesses, and this is a great help for the inspection and treatment of diseases. So the doctors can perform surgery more easily and accurately to significantly enhance the quality of medical technology. Therefore, various types of 3D stereoscopic surgical microscopes are presented in the market currently.

The conventional 3D stereoscopic surgical microscope such as Leica UTL 500 can provide 3D images to the doctors for surgery or treatment, and has a body, a cantilever, and an image set. The cantilever is rotatably connected to a front end of the body, extends out of the body and has a free end. The image set is connected to the cantilever and has an objective lens unit and at least two eyepiece units. The objective lens unit is connected to the free end of the cantilever and is used to capture images of the human body or tissue. The at least two eyepiece units are connected to the objective lens unit to enable the doctors to observe the images captured by the objective lens unit. However, the objective lens unit of the conventional 3D stereoscopic surgical microscope has a fixed-type lens, and the fixed-type lens only can provide a specific depth of field to the objective lens unit. Then, the objective lens unit of the conventional 3D stereoscopic surgical microscope only can capture images of organs or tissues of the human body at the same depth.

Since the depth of field of the lens of the objective lens unit is fixed, the objective lens unit cannot capture images of organs or tissues of the human body at different depths. Then, the objective lens unit of the conventional 3D stereoscopic surgical microscope cannot provide a clear 3D image of the tissue disease and the structure of blood vessels at some positions of the human body, and the doctors need to change the position of the conventional 3D stereoscopic surgical microscope to capture images to perform an operation or perform the operation according to experience under a limited image condition, and this will influence the fluency and efficiency of surgery and cannot provide a preferred medical effect to the patient.

To overcome the shortcomings, the present invention provides an adjustable dual-lens device to mitigate or obviate the aforementioned problems.

SUMMARY OF THE INVENTION

The main objective of the present invention is to provide an adjustable dual-lens device for 3D stereoscopic surgical microscopes that can adjust the dual-lens device to provide different depths of field to capture clear images of organs or tissues at different depths, to provide instant images at different depths and to shorten the operation time effectively.

The adjustable dual-lens device for 3D stereoscopic surgical microscopes has an outer casing, an image set, and an adjusting set. The outer casing is hollow and has an opening. The image set is mounted in the outer casing and has two lenses and an image processing chip. The lenses are pivotally mounted in the outer casing at a spaced interval. The image processing chip is mounted in the outer casing and is electrically connected to the lenses. The adjusting set is mounted in the outer casing, contacts the image set and has two adjusting units. Each one of the adjusting units has a driving motor, a cam, and a limiting element. The driving motor is mounted in the outer casing adjacent to one of the lenses and has a driving shaft. The cam is eccentrically mounted around the driving shaft and is pressed against the lens that is adjacent to the driving motor. The limiting element is connected to the outer casing and the corresponding lens to enable the corresponding lens to press against the cam.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
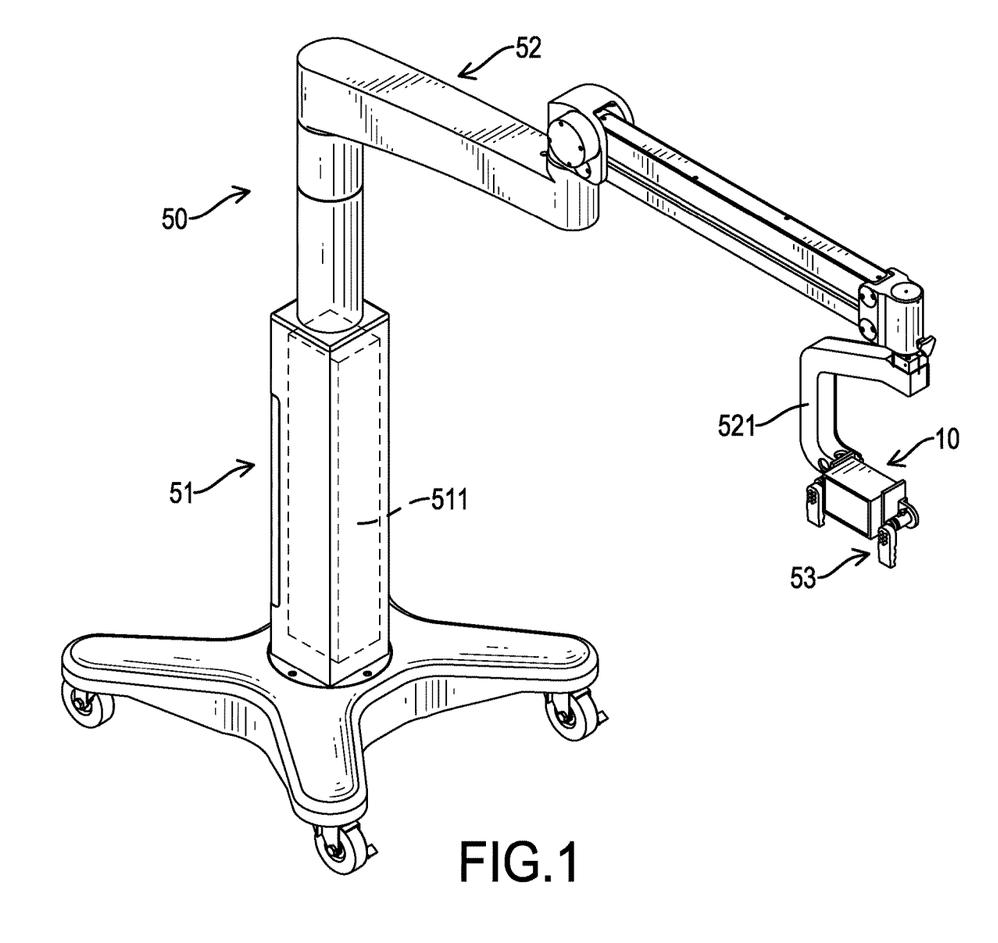
FIG. 1 is a perspective view of an adjustable dual-lens device for 3D stereoscopic surgical microscopes in accordance with the present invention.
Figure 2:
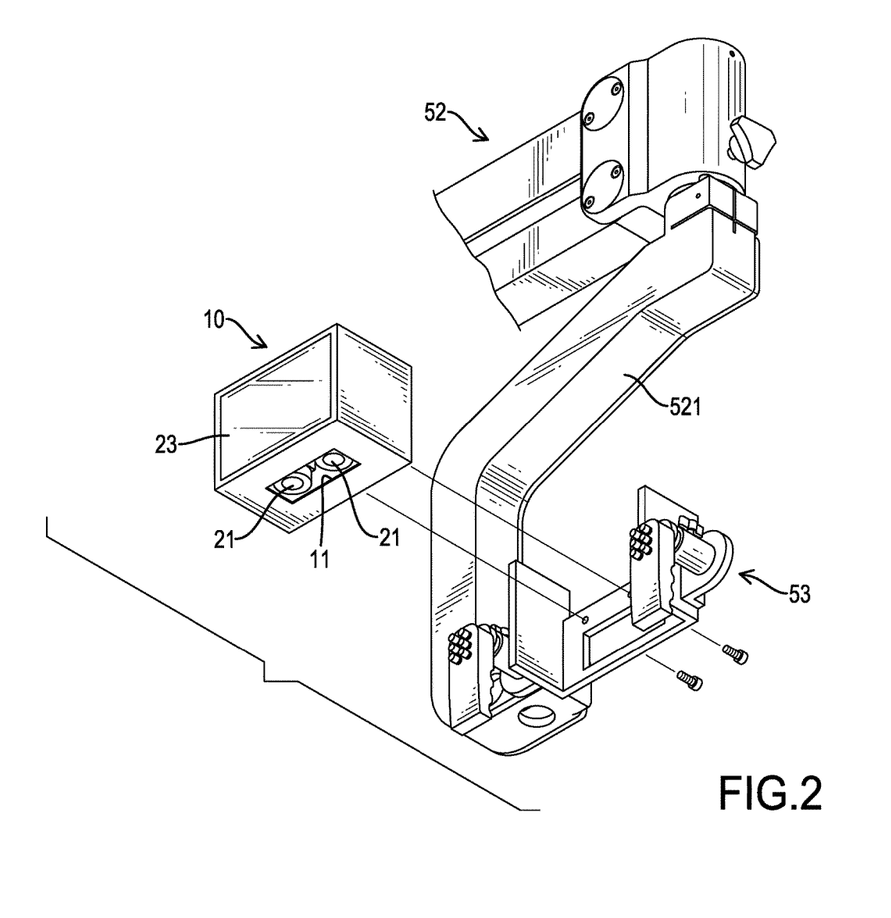
FIG. 2 is an enlarged and exploded perspective view of the adjustable dual-lens device in FIG. 1.
Figure 3:
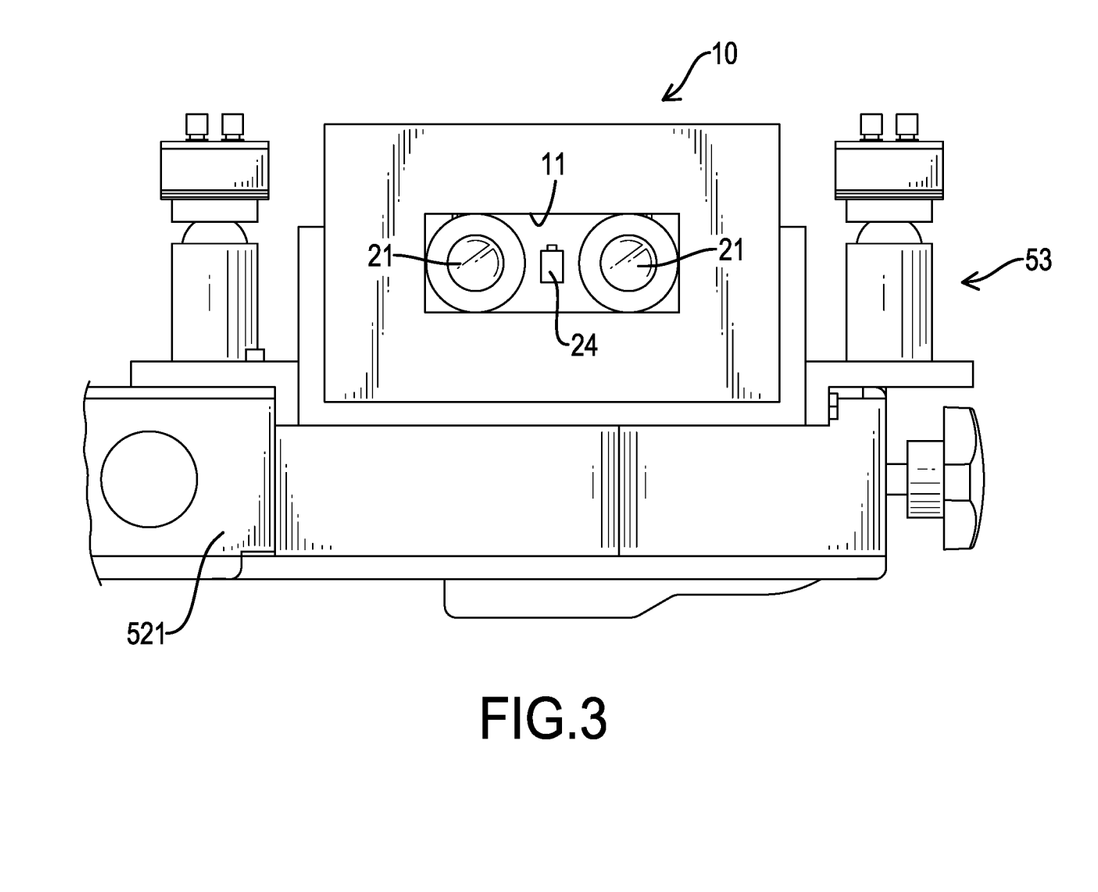
FIG. 3 is an enlarged bottom view of the adjustable dual-lens device in FIG. 1.

With reference to FIGS. 1 to 3, an adjustable dual-lens device for 3D stereoscopic surgical microscopes in accordance with the present invention is mounted on a 3D stereoscopic surgical microscope 50 to capture images from an object. The 3D stereoscopic surgical microscope 50 has a body 51, a robot set 52, and an operating set 53. The body 51 has a host computer 511. The host computer 511 is mounted in the body 51 and has a program processing interface. The robot set 52 is securely connected to the body 51 and has a rotating arm 521. The rotating arm 521 is rotatably connected to the body 51. The operating set 53 is connected to the robot set 52 and is electrically connected to the body 51.

Figure 4:
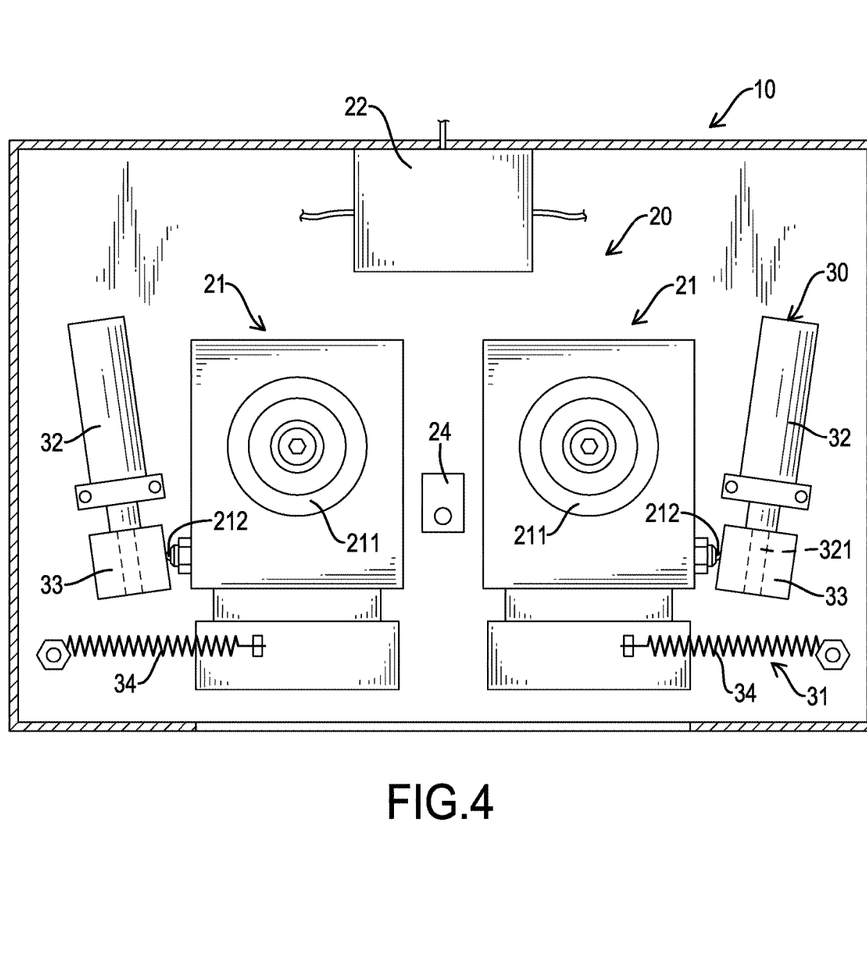
FIG. 4 is an enlarged side view in partial section of the adjustable dual-lens device in FIG. 2.
Figure 5:
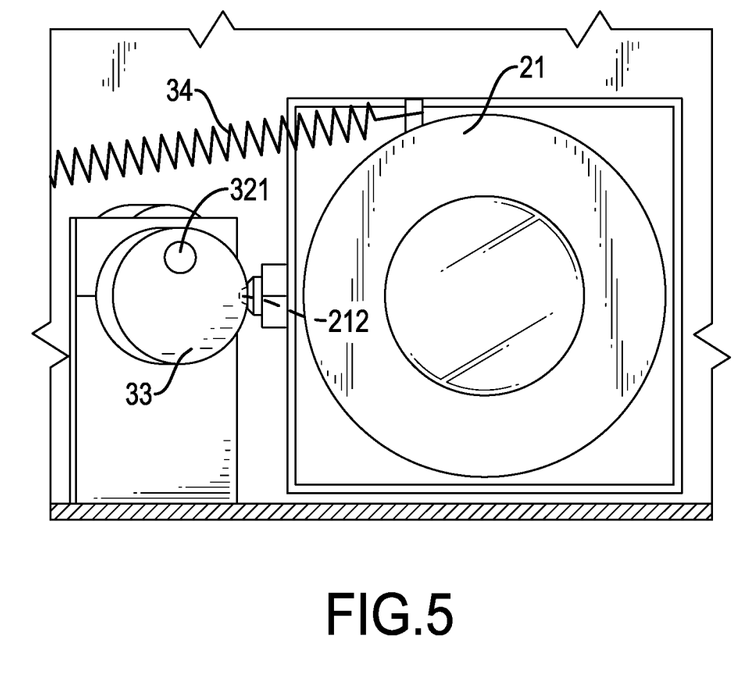
FIG. 5 is an enlarged bottom view in partial section of the adjustable dual-lens device in FIG. 4.

With further reference to FIGS. 4 and 5, the adjusting dual-lens device is connected to the robot set 52 of the 3D stereoscopic surgical microscope 50 and has an outer casing 10, an image set 20, and an adjusting set 30.

The outer casing 10 is hollow, is securely connected to the rotating arm 521 and has a bottom side, an inner surface, an outer side, and an opening 11. The opening 11 is formed through the bottom side of the outer casing 10.

The image set 20 is mounted in the outer casing 10, is electrically connected to the host computer 511 of the body 51 and has two lenses 21, an image processing chip 22, a display screen 23, and a positioner 24. The two lenses 21 are pivotally mounted in the outer casing 10 at a spaced interval and face the bottom side of the outer casing 10 in a range of the opening 11 of the outer casing 10. Then, the two lenses 21 capture images via the opening 11 of the outer casing 10.

Each one of the two lenses 21 has a middle, an outer side, a bearing seat 211, and a ball 212. The bearing seat 211 is mounted in the middle of the lens 21 and is securely mounted in the outer casing 10 to enable the lens 21 to rotate relative to the outer casing 10. Furthermore, the bearing seat 211 may be a ball bearing. In addition, each one of the two lenses 21 may be a Complementary Metal-Oxide-Semiconductor (CMOS) or a Charge-coupled Device (CCD). The outer side of the lens 21 faces the inner surface of the outer casing 10 and is opposite to the outer side of the other lens 21. The ball 212 is mounted on the outer side of the lens 21.

The image processing chip 22 is mounted in the outer casing 10, is electrically connected to the two lenses 21 and is electrically connected to the program processing interface of the host computer 511. Images that are captured from the two lenses 21 are processed by the image processing chip 22 and are composed into a 3D image from the program processing interface of the host computer 511. p The display screen 23 is mounted on the outer side of the outer casing 10, is electrically connected to the image processing chip 22 to show the 3D image that is formed from the program processing interface of the host computer 511. The positioner 24 is mounted in the outer casing 10 between the two lenses 21 and may be a dual laser transmitter. The positioner 24 may emit light on an object via the opening 11 of the outer casing 10 to provide a positioning effect to the two lenses 21 to enable the two lenses 21 to capture images from the object quickly. Furthermore, the positioner 24 may be used to correct tilt angles of the two lenses 21 and may be a dual-laser transmitter.

The adjusting set 30 is mounted in the outer casing 10, contacts the image set 20 and has two adjusting units 31. The two adjusting units 31 are mounted in the outer casing 10 and are respectively connected to the two lenses 21 between the outer sides of the two lenses 21 and the inner surface of the outer casing 10. Each one of the two adjusting units 31 has a driving motor 32, a cam 33, and a limiting element 34. The driving motor 32 is securely mounted in the outer casing 10 between the inner surface of the outer casing 10 and the outer side of one of the two lenses 21, and has a driving shaft 321. The driving shaft 321 is rotatably mounted in and extends out of the driving motor 32 toward the opening 11 of the outer casing 10. In addition, each driving motor 32 may be a stepper motor.

The cam 33 is securely mounted around the driving shaft 321 of the driving motor 32 to rotate with the driving shaft 321 and is pressed against the outer side of the lens 21 that is adjacent to the adjusting unit 31. Furthermore, the cam 33 is pressed against the ball 212 that is mounted on the outer side of the corresponding lens 21. With reference to FIG. 5, the cam 33 is eccentrically mounted around the driving shaft 321 of the corresponding driving motor 32. The limiting element 34 is connected to the outer casing 10 and is connected to the lens 21 that is pressed against the cam 33 of the adjusting unit 31. The limiting element 34 is connected between the outer casing 10 and the corresponding lens 21, and this may maintain the corresponding lens 21 to press against the cam 33 without separating from the cam 33. Furthermore, the cam 33 of the adjusting unit 31 is maintained to press against the ball 212 of the corresponding lens 21 by the limiting element 34, and this may prevent the corresponding lens 21 from excessive shaking when the corresponding lens 21 is pivoted relative to the outer casing 10 by the cam 33. Additionally, the limiting element 34 may be a spring.

Figure 6:
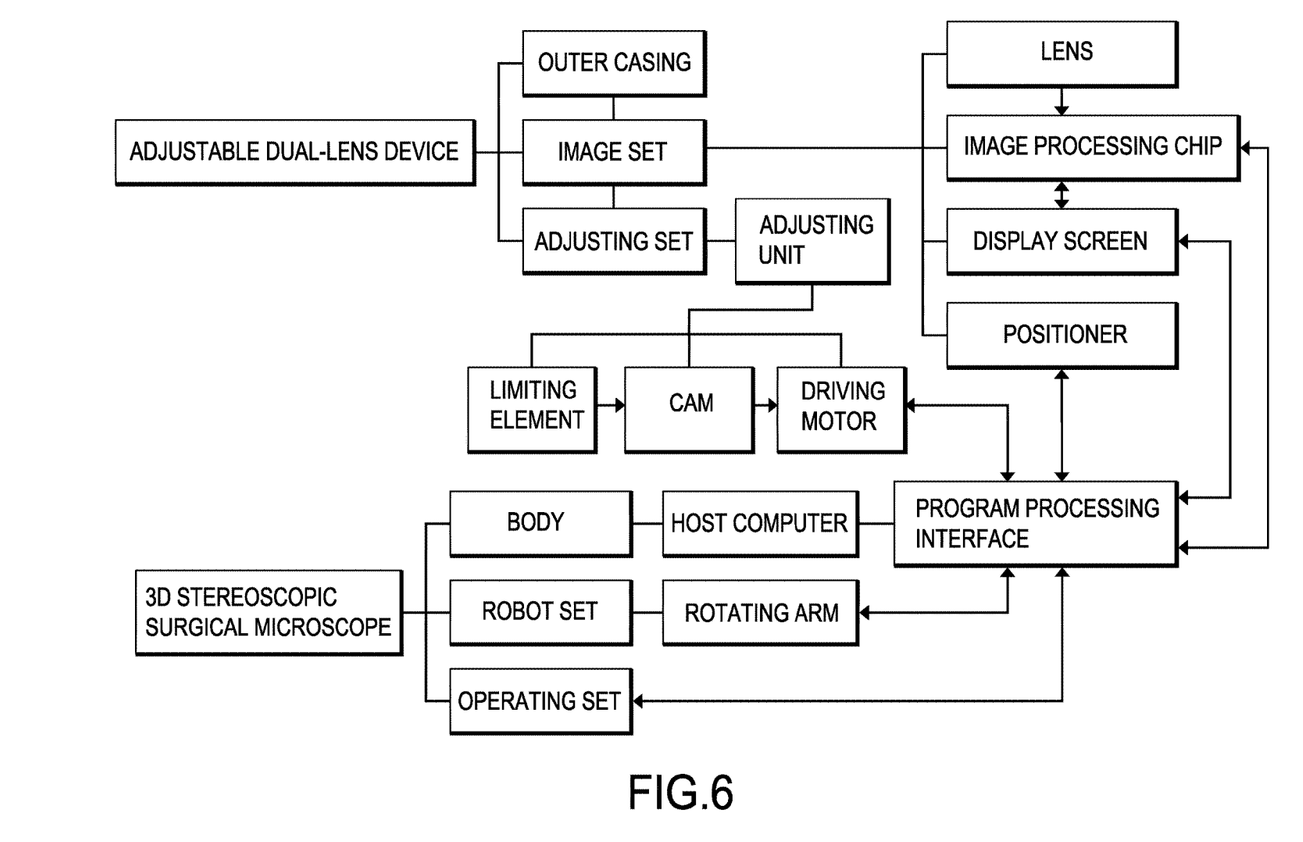
FIG. 6 is a block diagram of the adjustable dual-lens device in FIG. 1.
Figure 7:
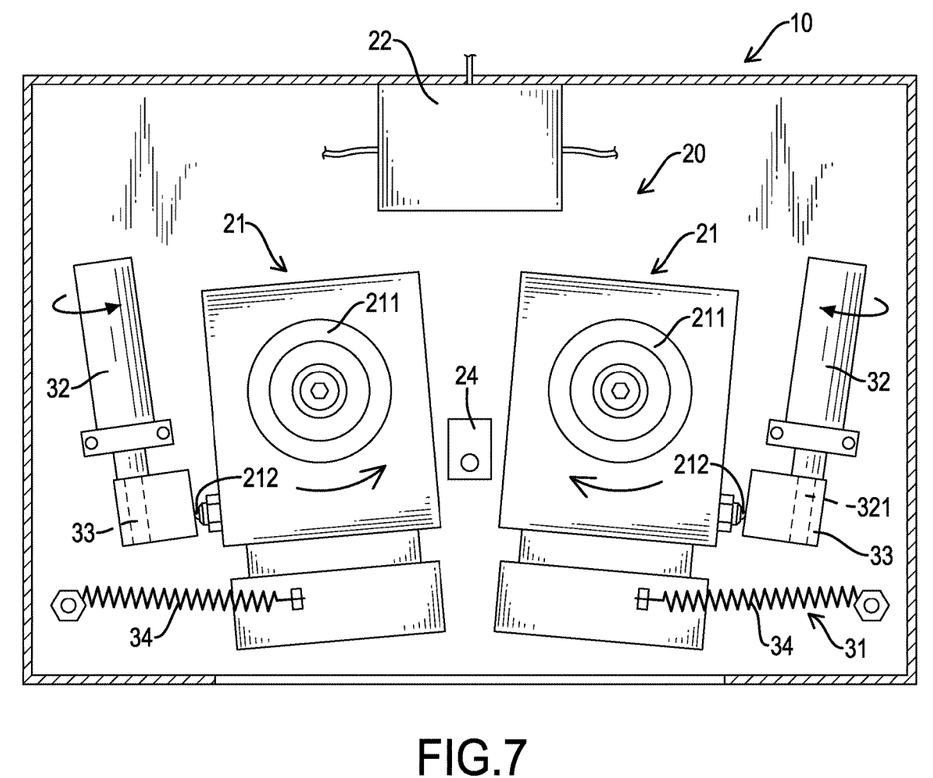
FIG. 7 is an operational side view in partial section of the adjustable dual-lens device in FIG. 4.

With reference to FIGS. 6 and 7, when the adjustable dual-lens device for 3D stereoscopic surgical microscopes is in use, the 3D stereoscopic surgical microscope 50 is moved close to an inspected object such as a human body, and to enable the two lenses 21 of the image set 20 to move over and align with a surgery or treatment position of the inspected object by the positioner 24. After moving the adjustable dual-lens device over the inspected object, a user may operate the operating set 53 to enable the program processing interface of the host computer 511 to send a signal to the two adjusting units 31 of the adjusting set 30 to drive the two driving motors 32. Then, the two cams 33 are rotated with the two driving shafts 321 relative to the two lenses 21.

When the two cams 33 are rotated with the two driving shafts 321, since the two cams 33 are respectively and eccentrically mounted around the two driving shafts 321 and the two limiting elements 34 are connected between the outer casing 10 and the two lenses 21, the two lenses 21 are pivoted relative to the outer casing 10 and are moved toward or away from each other. When the two lenses 21 are pivoted relative to the outer casing 10 to adjust an angle between the two lenses 21, the image set 20 may obtain different depths of field.

Then, the adjustable dual-lens device with different depths of filed may capture images of the surgery or treatment position of the inspected object and transfer the captured images to the host computer 511 via the image process chip 22 of the image set 20. The program processing interface of the host computer 511 may process and synthesize the captured images to form a 3D image. Finally, the 3D image sends to the display screen 23 to show the 3D image that is related to the surgery or treatment position of the inspected object. In addition, the adjustable dual-lens device with different depths of filed may capture images from a complex three-dimensional tissue or organ at different depths of a human body.

Figure 8:
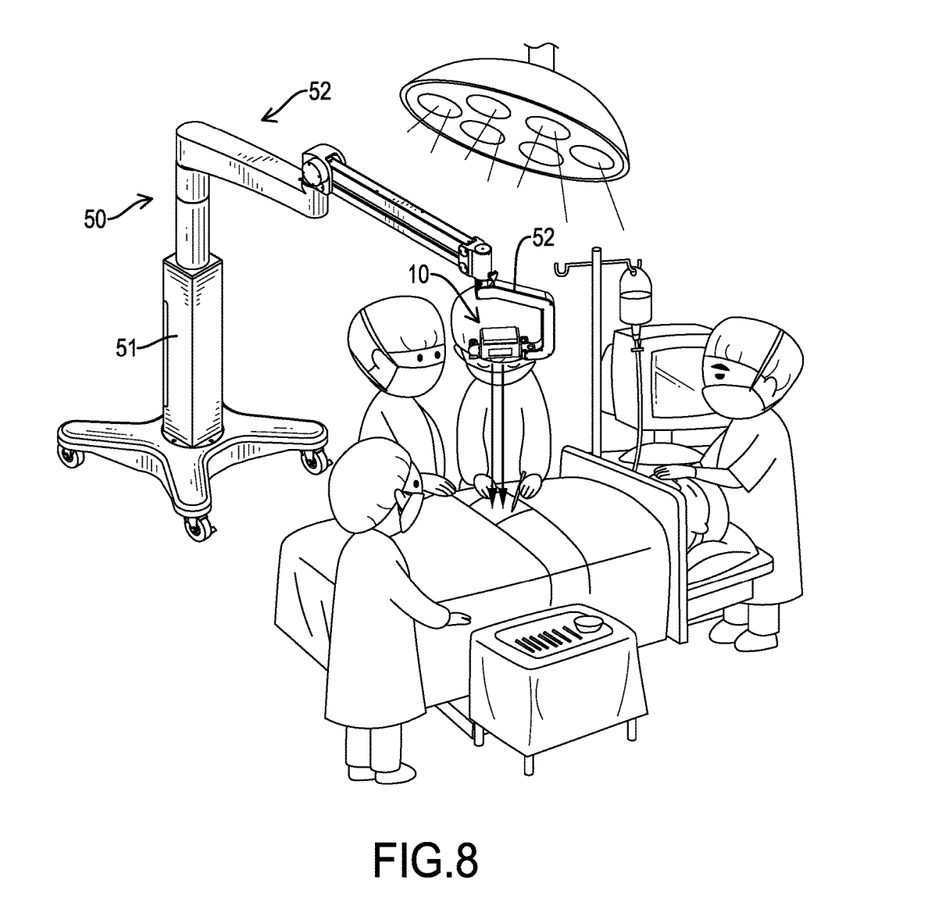
FIG. 8 is an operational perspective view of the adjustable dual-lens device in FIG. 1.

Then, with reference to FIG. 8, during the surgical procedure, the doctor may observe the lesion tissue and blood vessels in the complex three-dimensional tissue or organ at different depths by the adjustable dual-lens device with different depths of filed, and this may help the doctors to get instant dynamic 3D stereoscopic images at different depths during surgery and then accurately determine the positions of the lesions at different depths in the three-dimensional complex tissue or organ, and may reduce the error of cutting other parts of nerves and blood vessels in surgery, and make it easier for doctors to perform surgery and shorten the operation time.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An adjustable dual-lens device for 3D stereoscopic surgical microscopes having:
    an outer casing being hollow and having
        a bottom side;
        an inner surface; and
        an opening formed through the bottom side of the outer casing;
    an image set mounted in the outer casing and having
        two lenses pivotally mounted in the outer casing at a spaced interval and facing the bottom side of the outer casing in a range of the opening of the outer casing; and
        an image processing chip mounted in the outer casing and electrically connected to the two lenses; and
    an adjusting set mounted in the outer casing, contacting the image set and having
        two adjusting units mounted in the outer casing, respectively connected to the two lenses between the two lenses and the inner surface of the outer casing, and each one of the two adjusting units having
            a driving motor securely mounted in the outer casing between the inner surface of the outer casing and one of the two lenses, and having a driving shaft rotatably mounted in and extending out of the driving motor toward the opening of the outer casing;
            a cam eccentrically mounted around the driving shaft of the driving motor and pressed against the lens that is adjacent to the driving motor; and
            a limiting element connected to the outer casing and connected to the lens that is pressed against the cam to enable the corresponding lens to press against the cam without separating from the cam.

2. The adjustable dual-lens device as claimed in claim 1, wherein each one of the two lenses has a middle and a bearing seat, and the bearing seat is mounted in the middle of the lens and is securely mounted in the outer casing to enable the lens to rotate relative to the outer casing.

3. The adjustable dual-lens device as claimed in claim 2, wherein the bearing seat of each one of the two lenses is a ball bearing.

4. The adjustable dual-lens device as claimed in claim 1, wherein the image set has a positioner mounted in the outer casing between the two lenses to emit light via the opening of the outer casing to provide a positioning effect to the two lenses.

5. The adjustable dual-lens device as claimed in claim 2, wherein the image set has a positioner mounted in the outer casing between the two lenses to emit light via the opening of the outer casing to provide a positioning effect to the two lenses.

6. The adjustable dual-lens device as claimed in claim 3, wherein the image set has a positioner mounted in the outer casing between the two lenses to emit light via the opening of the outer casing to provide a positioning effect to the two lenses.

7. The adjustable dual-lens device as claimed in claim 4, wherein the positioner is a dual-laser transmitter.

8. The adjustable dual-lens device as claimed in claim 5, wherein the positioner is a dual-laser transmitter.

9. The adjustable dual-lens device as claimed in claim 6, wherein the positioner is a dual-laser transmitter.

10. The adjustable dual-lens device as claimed in claim 7, wherein each driving motor is a stepper motor.

11. The adjustable dual-lens device as claimed in claim 8, wherein each driving motor is a stepper motor.

12. The adjustable dual-lens device as claimed in claim 9, wherein each driving motor is a stepper motor.

13. The adjustable dual-lens device as claimed in claim 10, wherein each limiting element is a spring.

14. The adjustable dual-lens device as claimed in claim 11, wherein each limiting element is a spring.

15. The adjustable dual-lens device as claimed in claim 12, wherein each limiting element is a spring.

16. The adjustable dual-lens device as claimed in claim 13, wherein the image set has a display screen mounted on an outer side of the outer casing and electrically connected to the image processing chip to show a 3D image.

17. The adjustable dual-lens device as claimed in claim 14, wherein the image set has a display screen mounted on an outer side of the outer casing and electrically connected to the image processing chip to show a 3D image.

18. The adjustable dual-lens device as claimed in claim 15, wherein the image set has a display screen mounted on an outer side of the outer casing and electrically connected to the image processing chip to show a 3D image.

19. The adjustable dual-lens device as claimed in claim 16, wherein each one of the two lenses is a Complementary Metal-Oxide-Semiconductor or a Charge-coupled Device.

20. The adjustable dual-lens device as claimed in claim 17, wherein each one of the two lenses is a Complementary Metal-Oxide-Semiconductor or a Charge-coupled Device.

* * * * *